(12) United States Patent
Desmarais

(10) Patent No.: US 8,770,956 B2
(45) Date of Patent: Jul. 8, 2014

(54) SYSTEM FOR PRODUCING HIGH INTERNAL PHASE EMULSION FOAM

(75) Inventor: Thomas Allen Desmarais, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 465 days.

(21) Appl. No.: 12/795,010

(22) Filed: Jun. 7, 2010

(65) Prior Publication Data

US 2011/0159135 A1 Jun. 30, 2011

Related U.S. Application Data

(60) Provisional application No. 61/290,947, filed on Dec. 30, 2009.

(51) Int. Cl.
*B29C 44/28* (2006.01)

(52) U.S. Cl.
USPC ............... 425/4 C; 425/89; 425/94; 425/101; 425/104; 425/224; 425/377; 425/438; 425/447; 425/817 C; 425/DIG. 108; 264/45.8; 264/45.9; 264/46.4; 264/172.19; 264/316

(58) Field of Classification Search
CPC .... B29C 41/28; B29C 47/34; B29C 47/0876; B29C 33/68; B29C 47/0021; B29C 67/202
USPC ....... 425/4 C, 4 R, 115, 126.1, 224, 335, 337, 425/371, 406, 411, 505, DIG. 108, 817 R, 425/817 C, 89, 94, 101, 104, 145, 256, 425/376.1, 377, 438, 447, 470; 264/41, 264/45.8, 45.9, 46.2, 46.4, 46.5, 171.13, 264/172.19, 316

See application file for complete search history.

(56) References Cited

U.S. PATENT DOCUMENTS

| | | | | |
|---|---|---|---|---|
| 2,182,168 A | * | 12/1939 | Bierer | 425/373 |
| 2,434,541 A | * | 1/1948 | Bierer | 156/80 |
| 3,604,053 A | * | 9/1971 | Zemlin et al. | 425/89 |
| 3,700,365 A | * | 10/1972 | Spicer et al. | 425/34.2 |
| 3,775,221 A | * | 11/1973 | Reinhart et al. | 156/460 |
| 3,782,875 A | * | 1/1974 | Olschewski | 425/223 |
| 3,837,771 A | * | 9/1974 | Kolakowski et al. | 425/110 |
| 3,854,864 A | | 12/1974 | Mendoza | |
| 3,885,901 A | * | 5/1975 | Reiners | 425/371 |
| 3,891,376 A | * | 6/1975 | Gersbeck et al. | 425/373 |
| 3,915,612 A | * | 10/1975 | Gersbeck et al. | 425/373 |

(Continued)

FOREIGN PATENT DOCUMENTS

GB    1478987 A    7/1977

OTHER PUBLICATIONS

Zhang, L., et al., "Photoinitiated Copolymerization of Acrylamide and Styrene in Oil-in-Water Microemulsion," Journal of Applied Polymer Science, vol. 66, pp. 2543-2549 (1997).

(Continued)

*Primary Examiner* — Seyed Masoud Malekzadeh
(74) *Attorney, Agent, or Firm* — Andres E. Velarde; James Oehlenschlager

(57) ABSTRACT

A system for continuous High Internal Phase Emulsion (HIPE) foam production. A (HIPE) is produced then extruded onto a carrier sheet positioned on a belt surface.

20 Claims, 7 Drawing Sheets

(56) References Cited

U.S. PATENT DOCUMENTS

| | | | | |
|---|---|---|---|---|
| 3,917,439 A * | 11/1975 | Yovanovich | | 425/4 C |
| 3,938,927 A * | 2/1976 | Brinkmann et al. | | 425/373 |
| 3,954,544 A * | 5/1976 | Hooker | | 156/356 |
| 3,973,483 A * | 8/1976 | Appenzeller | | 100/302 |
| 3,973,894 A * | 8/1976 | Lindner et al. | | 425/370 |
| 3,988,508 A | 10/1976 | Lissant | | |
| 4,002,114 A * | 1/1977 | Guttinger | | 100/49 |
| 4,004,873 A * | 1/1977 | De Mets | | 425/335 |
| 4,007,078 A * | 2/1977 | Aoki et al. | | 156/159 |
| 4,015,921 A * | 4/1977 | De Mets | | 425/371 |
| 4,029,622 A | 6/1977 | Keller et al. | | |
| 4,045,262 A * | 8/1977 | Enzinger et al. | | 156/62.2 |
| 4,060,579 A * | 11/1977 | Schmitzer et al. | | 264/51 |
| 4,078,961 A * | 3/1978 | Aoki et al. | | 156/360 |
| 4,087,296 A * | 5/1978 | Hooker | | 156/71 |
| 4,128,369 A * | 12/1978 | Kemerer et al. | | 425/113 |
| 4,140,455 A * | 2/1979 | de Mets | | 425/371 |
| 4,154,562 A * | 5/1979 | Tabler | | 425/89 |
| 4,180,539 A * | 12/1979 | Clarke | | 264/143 |
| 4,196,527 A | 4/1980 | Escande | | |
| 4,247,269 A * | 1/1981 | Bezhanov et al. | | 425/63 |
| 4,264,291 A * | 4/1981 | Hoffmann et al. | | 425/224 |
| 4,316,411 A * | 2/1982 | Keaton | | 100/50 |
| 4,316,755 A * | 2/1982 | Flaum et al. | | 156/205 |
| 4,361,456 A * | 11/1982 | Reschke | | 156/179 |
| 4,373,892 A * | 2/1983 | Nordmann | | 425/207 |
| 4,378,278 A | 3/1983 | Allaway et al. | | |
| 4,405,555 A * | 9/1983 | Egidi et al. | | 264/315 |
| 4,528,157 A * | 7/1985 | Lettner et al. | | 264/237 |
| 4,622,894 A * | 11/1986 | Crandall et al. | | 100/118 |
| 4,681,033 A * | 7/1987 | Crandall et al. | | 100/118 |
| 4,718,843 A * | 1/1988 | Carlsson et al. | | 425/371 |
| 4,731,008 A * | 3/1988 | Hayashi et al. | | 425/335 |
| 4,744,854 A * | 5/1988 | Schenz | | 156/498 |
| 4,768,645 A | 9/1988 | Farris | | |
| 4,850,846 A * | 7/1989 | Walter | | 425/337 |
| 4,877,487 A * | 10/1989 | Miller | | 162/360.3 |
| 4,904,491 A * | 2/1990 | Morikawa et al. | | 426/502 |
| 4,913,899 A * | 4/1990 | Hartig | | 425/71 |
| 4,932,855 A * | 6/1990 | Gersbeck et al. | | 425/193 |
| 5,029,387 A | 7/1991 | Mitchell et al. | | |
| 5,061,337 A * | 10/1991 | Fraser | | 156/351 |
| 5,149,720 A | 9/1992 | Desmarais et al. | | |
| 5,189,070 A | 2/1993 | Brownscombe et al. | | |
| 5,210,104 A | 5/1993 | Bass et al. | | |
| 5,223,071 A * | 6/1993 | Gersbeck | | 156/358 |
| 5,252,619 A | 10/1993 | Brownscombe et al. | | |
| 5,266,341 A * | 11/1993 | Morikawa et al. | | 426/231 |
| 5,290,820 A | 3/1994 | Brownscombe et al. | | |
| 5,295,805 A * | 3/1994 | Akamatsu et al. | | 425/373 |
| 5,306,733 A | 4/1994 | Adamski et al. | | |
| 5,306,734 A | 4/1994 | Bass et al. | | |
| 5,306,831 A | 4/1994 | Beshouri et al. | | |
| 5,314,322 A * | 5/1994 | Morikawa et al. | | 425/142 |
| 5,334,621 A | 8/1994 | Beshouri | | |
| 5,340,842 A | 8/1994 | Adamski et al. | | |
| 5,358,974 A | 10/1994 | Brownscombe et al. | | |
| 5,362,762 A | 11/1994 | Beshouri | | |
| 5,387,207 A | 2/1995 | Dyer et al. | | |
| 5,394,738 A | 3/1995 | Bass et al. | | |
| 5,411,779 A * | 5/1995 | Nakajima et al. | | 428/36.91 |
| 5,537,919 A * | 7/1996 | Bielfeldt et al. | | 100/48 |
| 5,562,028 A * | 10/1996 | Bielfeldt et al. | | 100/311 |
| 5,575,203 A * | 11/1996 | Bielfeldt | | 100/311 |
| 5,579,687 A * | 12/1996 | Bielfeldt | | 100/311 |
| 5,634,281 A | 6/1997 | Nugent | | |
| 5,646,193 A | 7/1997 | Brownscombe et al. | | |
| 5,670,101 A | 9/1997 | Nathoo et al. | | |
| 5,792,306 A * | 8/1998 | Verbeiren | | 156/358 |
| 5,810,965 A * | 9/1998 | Fwu | | 156/359 |
| 5,817,704 A | 10/1998 | Shiveley et al. | | |
| 5,827,909 A | 10/1998 | Desmarais | | |
| 5,899,321 A | 5/1999 | El-Ibiary | | |
| 5,912,276 A | 6/1999 | Adamski et al. | | |
| 6,057,376 A | 5/2000 | Bass et al. | | |
| 6,077,065 A * | 6/2000 | Sumiyoshi et al. | | 425/368 |
| 6,103,288 A * | 8/2000 | Kobayashi et al. | | 426/503 |
| 6,103,645 A | 8/2000 | Chang et al. | | |
| 6,116,882 A * | 9/2000 | Sadinski et al. | | 425/71 |
| 6,166,097 A | 12/2000 | Yonemura et al. | | |
| 6,221,301 B1 * | 4/2001 | Tsunashima et al. | | 264/466 |
| 6,274,638 B1 | 8/2001 | Yonemura et al. | | |
| 6,299,808 B1 | 10/2001 | Mork et al. | | |
| 6,323,250 B1 | 11/2001 | Kadonaga et al. | | |
| 6,362,243 B1 | 3/2002 | Sasabe et al. | | |
| 6,365,642 B1 | 4/2002 | Dyer et al. | | |
| 6,369,121 B1 | 4/2002 | Catalfamo et al. | | |
| 6,379,137 B1 * | 4/2002 | Ecker | | 425/71 |
| 6,395,792 B1 | 5/2002 | Nagasuna et al. | | |
| 6,395,793 B1 | 5/2002 | Kadonaga et al. | | |
| 6,468,461 B1 * | 10/2002 | Sumiyoshi et al. | | 264/280 |
| 6,525,106 B1 | 2/2003 | Desmarais et al. | | |
| 6,573,305 B1 | 6/2003 | Thunhorst et al. | | |
| 6,630,519 B2 | 10/2003 | Fujimaru et al. | | |
| 6,649,665 B2 | 11/2003 | Kadonaga et al. | | |
| 6,730,711 B2 | 5/2004 | Sasabe et al. | | |
| 6,730,712 B2 | 5/2004 | Sasabe et al. | | |
| 6,750,263 B2 | 6/2004 | Sasabe et al. | | |
| 6,759,080 B2 | 7/2004 | Thunhorst et al. | | |
| 6,765,029 B2 | 7/2004 | Sasabe et al. | | |
| 6,797,735 B2 | 9/2004 | Nagasuna et al. | | |
| 6,822,010 B2 | 11/2004 | Fujimaru et al. | | |
| 6,846,439 B2 | 1/2005 | Kadonaga et al. | | |
| 6,890,963 B2 | 5/2005 | Clear et al. | | |
| 7,001,548 B2 | 2/2006 | Sakamoto et al. | | |
| 7,134,865 B2 * | 11/2006 | Barroche-Heinrich et al. | | 425/238 |
| 7,304,312 B2 | 12/2007 | Hopaluk et al. | | |
| 7,393,878 B2 | 7/2008 | Desmarais et al. | | |
| 7,427,372 B2 * | 9/2008 | Morita | | 264/210.2 |
| 7,458,317 B2 * | 12/2008 | Sebastian et al. | | 100/152 |
| 7,649,186 B2 | 1/2010 | Kabuki et al. | | |
| 7,770,715 B2 * | 8/2010 | Burckhardt | | 198/626.1 |
| 2003/0213380 A1 * | 11/2003 | Sebastian et al. | | 100/151 |
| 2006/0025521 A1 | 2/2006 | Frenz et al. | | |

OTHER PUBLICATIONS

Apen, "Polymeric Foam by Photoinitiated Polymerization of Trimethylolpropanetriacrylate: Initiate and Solvent Effects," Journal of Cellular Plastics, vol. 31, pp. 74-92 (1995).

Ghosh, S.K., et al., "Inverse Emulsion Polymerization of Acrylamide Using the Oil-Soluble Photoinitiator 2,2-Dimethoxy-2-Phenyl Acetophenone (DMPA)," Polymer Science: Recent Advances, vol. 2, pp. 9-14 (1994).

Apen, et al., "Bromaine-Containing Polymeric Foams," Journal of Cellular Plastics, vol. 28, pp. 557-570 (1992).

Stannett, V., et al., "Kinetics of the Radiation-Induced Polymerization of Styrene in Emulsion," Journal of Colloid and Interface Science, vol. 71, No. 1, pp. 130-140 (1979).

* cited by examiner

SYSTEM FOR PRODUCING HIGH INTERNAL PHASE EMULSION FOAM

CROSS REFERENCE TO RELATED APPLICATION

This application claims the benefit of U.S. Provisional Application No. 61/290,947 filed on 30 Dec. 2009, the substance of which is incorporated herein by reference.

FIELD OF THE INVENTION

This application relates to producing High Internal Phase Emulsion (HIPE) foams using a continuous process.

BACKGROUND OF THE INVENTION

An emulsion is a dispersion of one liquid in another liquid and generally is in the form of a water-in-oil mixture having an aqueous or water phase dispersed within a substantially immiscible continuous oil phase. Water-in-oil (or oil in water) emulsions having a high ratio of dispersed phase to continuous phase are known in the art as High Internal Phase Emulsions, also referred to as "HIPE" or HIPEs. At relatively high dispersed aqueous phase to continuous oil phase ratios the continuous oil phase becomes essentially a thin film separating and coating the droplet-like structures of the internal, dispersed aqueous phase. In certain HIPEs continuous oil phase comprises one or more polymerizable monomers. These monomers can be polymerized, forming a cellular structure, for example a foam, having a cell size distribution defined by the size distribution of the dispersed, aqueous phase droplets.

HIPE foams can be formed in a continuous process, wherein a HIPE is formed and then moved through the various stages used to produce a HIPE foam. A movable support member, such as a belt, will typically be used to move a HIPE from one stage to the next. Following the formation of the HIPE the next stage involves the polymerization of the monomers present in the oil phase to produce a HIPE foam. Initiator, which is used to start polymerization, is generally added during HIPE formation either to the separate aqueous and continuous oil phases or to the HIPE during the emulsion making process. In addition to the presence of initiator heat can be used to accelerate the polymerization reaction, for example the individual aqueous and oil phases may be heated to accelerate the polymerization reaction.

The environmental conditions used to polymerize a HIPE into a HIPE foam can be very harmful to equipment, such as belts. For instance polymerization of a HIPE often involves the use of high temperatures. Further, to minimize fluid loss in HIPEs during the polymerization process and to provide a more equalized temperature distribution, steam may be used as the heat source. The steam can penetrate the materials in the belt and cause the belt to swell. Further, HIPEs are often produced using one or more types of corrosive salts, which can migrate, enter the belt and degrade it. In addition to the use of heat to polymerize HIPEs other methods can be used that are harmful to belts, such as the use of actinic radiation supplied by an ultraviolet source.

These harsh environments while beneficial to the polymerization of HIPEs can be harmful to the belts upon which HIPEs are extruded and transported on. These environments are not only directly harmful to the belts and facilitate their deterioration; they can also affect the quality of the HIPE foam produced from such belts. HIPEs in a continuous process are often extruded onto the surface of a belt as a thin sheet. If the belt has imperfections on its surface these imperfections can negatively influence the HIPE extruded thereon. For example, if the belt has bulges or bumps on its surface these imperfections can result in uneven HIPE foam sheets, or sheets having holes, which cannot be used. Further if the HIPE foam requires an open celled structure on its surface, for the absorption of liquids, a damaged belt surface could cause the HIPE foam surface to have a closed cell structure, and therefore inhibit the intended function of the HIPE foam. Additionally, at some point in the HIPE foam process, the HIPE foam will need to be detached from the belt, and if the belt surface is uneven or damaged the HIPE foam might be damaged during the removal step as the HIPE foam will adhere to the belt surface.

One potential solution to providing a suitable belt surface has been to use various methods to strengthen or enhance a belt surface, for example, by laminating or impregnating a belt surface with materials that will provide a smooth belt surface, such as Teflon or resins. These materials have a number of technical drawbacks, such as successfully adhering the materials to a belt surface, and while potentially lengthening the life of a belt are very costly, and will eventually fail. Another method has involved the use of a film layer which resides on and moves along with the surface of a belt and unto which a HIPE is extruded. However, there also have been drawbacks to this approach. A HIPE is transported in a continuous process through the use of endless belts, which at their ends have pulleys. The pulleys stretch the outer surface of a belt, but once the belt passes the pulley the belt contracts back to its original shape. These changes in the outer surface of the belt cause the film residing on the belt surface to fold back upon itself forming ripple across the film surface, as the belt contracts. The ripples produced cause deformations in the HIPE extruded on them.

A further problem of using belts in the HIPE foam making process relates to the static nature of the belts used to transport the HIPEs through the HIPE foam making process, and therefore also any films resting on the belts. When starting the process by extruding a HIPE onto a belt surface, the HIPE that is first extruded is often not usable to produce a HIPE foam. One attempted solution has been to try and make the extruding devices mobile. This has proved problematic for several reasons, the first of which relates to the size of the extruding device required, in that to produce HIPE foams at a high rate a relatively large extruding device is needed to extrude large quantities of HIPE onto a belt, such size makes the extruding devices bulky and difficult to move. Another factor is the quality of the HIPE extruded onto the belt, in that movement of the extruding device could cause the HIPE being extruded to be extruded unevenly—leading to non-usable HIPE foam. A further consideration is the extruding devices are substantially fixed in place by the HIPE feed lines that supply them. Another attempt to solve the problem has been to try and make the belt that the HIPE is extruded on mobile. This has not proven usable as moving the belt slackens the tension in the belt leading to HIPE that is once again unevenly extruded; and as with the extruding device, causing extra movement of the belt creates an unstable surface for the HIPE, once again resulting in uneven extrusion of the HIPE. Further, long belts require high tension in order to be driven to overcome drag forces, and wider systems provide economies of scale, hence the support structures and the pulleys themselves have to be substantial, making the movement of said structures more difficult, especially more difficult to do accurately time after time.

Therefore there exists a need for a way to protect a belt surface for HIPE foam formation in a continuous process, and while doing so also provide a system that allows for the selection of which HIPE is used to produce HIPE foam.

SUMMARY OF THE INVENTION

A High Internal Phase Emulsion foam producing system is provided that comprises a High Internal Phase Emulsion extruding device; a belt; a carrier sheet, wherein at least a portion of the carrier sheet is in contact with the belt; and a retractable piston assembly, wherein the retractable piston assembly is in operable association with the carrier sheet.

A High Internal Phase Emulsion foam producing system is provided that comprises an extruding device; a belt; a carrier sheet, wherein at least a portion of the carrier sheet is in contact with the belt; a rotatable shaft adapted to support and rotate with the carrier sheet, the rotatable shaft having a first end and a second end; and a retractable piston assembly, mounted to the first end and second end of the rotatable shaft.

DETAILED DESCRIPTION OF THE INVENTION

Figure 1:
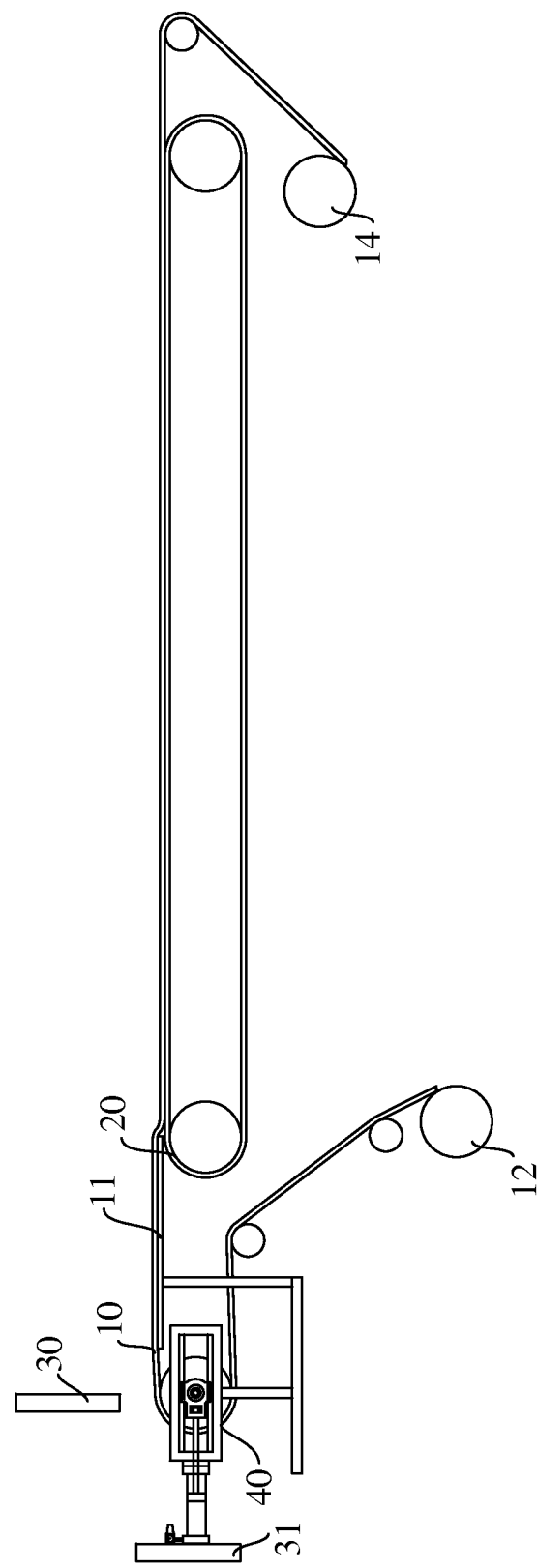
FIG. 1 is a schematic side view of an embodiment of the present invention.

The present invention relates to a method for continuous High Internal Phase Emulsion (HIPE) foam production. A HIPE is produced then extruded onto a movable surface, which in the present invention comprises a carrier sheet positioned on a belt surface. The carrier sheet provides a releasable surface, which is substantially free from irregularities, and moves in a horizontal direction along with the belt to transport the HIPE from the extrusion point to the following stages of HIPE foam production. The carrier sheet, at the point of extrusion rests upon a retractable piston assembly. The retractable piston assembly allows the carrier sheet to be positioned under the point of extrusion when a HIPE is suitable for HIPE foam production and to be moved away from the point of extrusion when the HIPE is not suitable for HIPE foam production, for example during start-up and shut-down of the HIPE foam making process.

A High Internal Phase Emulsion (HIPE) comprises two phases. One phase is a continuous oil phase comprising monomers that are polymerized to form a HIPE foam and an emulsifier to help stabilize the HIPE. The oil phase may also include one or more photoinitiators. The monomer component may be present in an amount of from about 80% to about 99%, and in certain embodiments from about 85% to about 95% by weight of the oil phase. The emulsifier component, which is soluble in the oil phase and suitable for forming a stable water-in-oil emulsion may be present in the oil phase in an amount of from about 1% to about 20% by weight of the oil phase. The emulsion may be formed at an emulsification temperature of from about 20° C. to about 130° C. and in certain embodiments from about 50° C. to about 100° C.

In general, the monomers will include from about 20% to about 97% by weight of the oil phase at least one substantially water-insoluble monofunctional alkyl acrylate or alkyl methacrylate. For example, monomers of this type may include $C_4$-$C_{18}$ alkyl acrylates and $C_2$-$C_{18}$ methacrylates, such as ethylhexyl acrylate, butyl acrylate, hexyl acrylate, octyl acrylate, nonyl acrylate, decyl acrylate, isodecyl acrylate, tetradecyl acrylate, benzyl acrylate, nonyl phenyl acrylate, hexyl methacrylate, 2-ethylhexyl methacrylate, octyl methacrylate, nonyl methacrylate, decyl methacrylate, isodecyl methacrylate, dodecyl methacrylate, tetradecyl methacrylate, and octadecyl methacrylate.

The oil phase may also comprise from about 2% to about 40%, and in certain embodiments from about 10% to about 30%, by weight of the oil phase, a substantially water-insoluble, polyfunctional crosslinking alkyl acrylate or methacrylate. This crosslinking comonomer, or crosslinker, is added to confer strength and resilience to the resulting HIPE foam. Examples of crosslinking monomers of this type comprise monomers containing two or more activated acrylate, methacrylate groups, or combinations thereof. Nonlimiting examples of this group include 1,6-hexanedioldiacrylate, 1,4-butanedioldimethacrylate, trimethylolpropane triacrylate, trimethylolpropane trimethacrylate, 1,12-dodecyldimethacrylate, 1,14-tetradecanedioldimethacrylate, ethylene glycol dimethacrylate, neopentyl glycol diacrylate (2,2-dimethylpropanediol diacrylate), hexanediol acrylate methacrylate, glucose pentaacrylate, sorbitan pentaacrylate, and the like. Other examples of crosslinkers contain a mixture of acrylate and methacrylate moieties, such as ethylene glycol acrylate-methacrylate and neopentyl glycol acrylate-methacrylate. The ratio of methacrylate:acrylate group in the mixed crosslinker may be varied from 50:50 to any other ratio as needed.

Any third substantially water-insoluble comonomer may be added to the oil phase in weight percentages of from about 0% to about 15% by weight of the oil phase, in certain embodiments from about 2% to about 8%, to modify properties of the HIPE foams. In certain embodiments, "toughening" monomers may be desired which impart toughness to the resulting HIPE foam. These include monomers such as styrene, vinyl chloride, vinylidene chloride, isoprene, and chloroprene. Without being bound by theory, it is believed that such monomers aid in stabilizing the HIPE during polymerization (also known as "curing") to provide a more homogeneous and better formed HIPE foam which results in better toughness, tensile strength, abrasion resistance, and the like. Monomers may also be added to confer flame retardancy as disclosed in U.S. Pat. No. 6,160,028 (Dyer) issued Dec. 12, 2000. Monomers may be added to confer color, for example vinyl ferrocene, fluorescent properties, radiation resistance, opacity to radiation, for example lead tetraacrylate, to disperse charge, to reflect incident infrared light, to absorb radio waves, to form a wettable surface on the HIPE foam struts, or for any other desired property in a HIPE foam. In some cases, these additional monomers may slow the overall process of conversion of HIPE to HIPE foam, the tradeoff being necessary if the desired property is to be conferred. Thus, such monomers can be used to slow down the polymerization rate of a HIPE. Examples of monomers of this type comprise styrene and vinyl chloride.

The oil phase may further contain an emulsifier used for stabilizing the HIPE. Emulsifiers used in a HIPE can include:

(a) sorbitan monoesters of branched $C_{16}$-$C_{24}$ fatty acids; linear unsaturated $C_{16}$-$C_{22}$ fatty acids; and linear saturated $C_{12}$-$C_{14}$ fatty acids, such as sorbitan monooleate, sorbitan monomyristate, and sorbitan monoesters, sorbitan monolaurate diglycerol monooleate (DGMO), polyglycerol monoisostearate (PGMIS), and polyglycerol monomyristate (PGMM); (b) polyglycerol monoesters of—branched $C_{16}$-$C_{24}$ fatty acids, linear unsaturated $C_{16}$-$C_{22}$ fatty acids, or linear saturated $C_{12}$-$C_{14}$ fatty acids, such as diglycerol monooleate (for example diglycerol monoesters of C18:1 fatty acids), diglycerol monomyristate, diglycerol monoisostearate, and diglycerol monoesters; (c) diglycerol monoaliphatic ethers of—branched $C_{16}$-$C_{24}$ alcohols, linear unsaturated $C_{16}$-$C_{22}$ alcohols, and linear saturated $C_{12}$-$C_{14}$ alcohols, and mixtures of these emulsifiers. See U.S. Pat. No. 5,287,207 (Dyer et al.), issued Feb. 7, 1995 and U.S. Pat. No. 5,500,451 (Goldman et al.) issued Mar. 19, 1996. Another emulsifier that may be used is polyglycerol succinate (PGS), which is formed from an alkyl succinate, glycerol, and triglycerol.

Such emulsifiers, and combinations thereof, may be added to the oil phase so that they comprise between about 1% and about 20%, in certain embodiments from about 2% to about 15%, and in certain other embodiments from about 3% to about 12% by weight of the oil phase In certain embodiments, coemulsifiers may also be used to provide additional control of cell size, cell size distribution, and emulsion stability, particularly at higher temperatures, for example greater than about 65° C. Examples of coemulsifiers include phosphatidyl cholines and phosphatidyl choline-containing compositions, aliphatic betaines, long chain $C_{12}$-$C_{22}$ dialiphatic quaternary ammonium salts, short chain $C_1$-$C_4$ dialiphatic quaternary ammonium salts, long chain $C_{12}$-$C_{22}$ dialkoyl(alkenoyl)-2-hydroxyethyl, short chain $C_1$-$C_4$ dialiphatic quaternary ammonium salts, long chain $C_{12}$-$C_{22}$ dialiphatic imidazolinium quaternary ammonium salts, short chain $C_1$-$C_4$ dialiphatic imidazolinium quaternary ammonium salts, long chain $C_{12}$-$C_{22}$ monoaliphatic benzyl quaternary ammonium salts, long chain $C_{12}$-$C_{22}$ dialkoyl(alkenoyl)-2-aminoethyl, short chain $C_1$-$C_4$ monoaliphatic benzyl quaternary ammonium salts, short chain $C_1$-$C_4$ monohydroxyaliphatic quaternary ammonium salts. In certain embodiments, ditallow dimethyl ammonium methyl sulfate (DTDMAMS) may be used as a coemulsifier.

Photoinitiators may comprise between about 0.05% and about 10%, and in certain embodiments between about 0.2% and about 10% by weight of the oil phase. Lower amounts of photoinitiator allow light to better penetrate the HIPE foam, which can provide for polymerization deeper into the HIPE foam. However, if polymerization is done in an oxygen-containing environment, there should be enough photoinitiator to initiate the polymerization and overcome oxygen inhibition. Photoinitiators can respond rapidly and efficiently to a light source with the production of radicals, cations, and other species that are capable of initiating a polymerization reaction. The photoinitiators used in the present invention may absorb UV light at wavelengths of about 200 nanometers (nm) to about 800 nm, in certain embodiments about 200 nm to about 350 nm. If the photoinitiator is in the oil phase, suitable types of oil-soluble photoinitiators include benzyl ketals, α-hydroxyalkyl phenones, α-amino alkyl phenones, and acylphospine oxides. Examples of photoinitiators include 2,4,6-[trimethylbenzoyldiphosphine]oxide in combination with 2-hydroxy-2-methyl-1-phenylpropan-1-one (50:50 blend of the two is sold by Ciba Speciality Chemicals, Ludwigshafen, Germany as DAROCUR® 4265); benzyl dimethyl ketal (sold by Ciba Geigy as IRGACURE 651); α-,α-dimethoxy-α-hydroxy acetophenone (sold by Ciba Speciality Chemicals as DAROCUR® 1173); 2-methyl-1-[4-(methyl thio)phenyl]-2-morpholino-propan-1-one (sold by Ciba Speciality Chemicals as IRGACURE® 907); 1-hydroxycyclohexyl-phenyl ketone (sold by Ciba Speciality Chemicals as IRGACURE® 184); bis(2,4,6-trimethylbenzoyl)-phenylphosphineoxide (sold by Ciba Speciality Chemicals as IRGACURE 819); diethoxyacetophenone, and 4-(2-hydroxyethoxy)phenyl-(2-hydroxy-2-methylpropyl) ketone (sold by Ciba Speciality Chemicals as IRGACURE® 2959); and Oligo [2-hydroxy-2-methyl-1-[4-(1-methylvinyl) phenyl]propanone] (sold by Lamberti spa, Gallarate, Italy as ESACURE® KIP EM.

The dispersed aqueous phase of a HIPE comprises water, and may also comprise one or more components, such as initiator, photoinitiator, or electrolyte, wherein in certain embodiments, the one or more components are at least partially water soluble.

One component of the aqueous phase may be a water-soluble electrolyte. The water phase may contain from about 0.2% to about 40%, in certain embodiments from about 2% to about 20%, by weight of the aqueous phase of a water-soluble electrolyte. The electrolyte minimizes the tendency of monomers, comonomers, and crosslinkers that are primarily oil soluble to also dissolve in the aqueous phase. Examples of electrolytes include chlorides or sulfates of alkaline earth metals such as calcium or magnesium and chlorides or sulfates of alkali earth metals such as sodium. Such electrolyte can include a buffering agent for the control of pH during the polymerization, including such inorganic counterions as phosphate, borate, and carbonate, and mixtures thereof. Water soluble monomers may also be used in the aqueous phase, examples being acrylic acid and vinyl acetate.

Another component that may be present in the aqueous phase is a water-soluble free-radical initiator. The initiator can be present at up to about 20 mole percent based on the total moles of polymerizable monomers present in the oil phase. In certain embodiments, the initiator is present in an amount of from about 0.001 to about 10 mole percent based on the total moles of polymerizable monomers in the oil phase. Suitable initiators include ammonium persulfate, sodium persulfate, potassium persulfate, 2,2'-azobis(N,N'-dimethyleneisobutyramidine)dihydrochloride, and other suitable azo initiators. In certain embodiments, to reduce the potential for premature polymerization which may clog the emulsification system, addition of the initiator to the monomer phase may be just after or near the end of emulsification.

Photoinitiators present in the aqueous phase may be at least partially water soluble and may comprise between about 0.05% and about 10%, and in certain embodiments between about 0.2% and about 10% by weight of the oil phase. Lower amounts of photoinitiator allow light to better penetrate the HIPE foam, which can provide for polymerization deeper into the HIPE foam. However, if polymerization is done in an oxygen-containing environment, there should be enough photoinitiator to initiate the polymerization and overcome oxygen inhibition. Photoinitiators can respond rapidly and efficiently to a light source with the production of radicals, cations, and other species that are capable of initiating a polymerization reaction. The photoinitiators used in the present invention may absorb UV light at wavelengths of from about 200 nanometers (nm) to about 800 nm, in certain embodiments from about 200 nm to about 350 nm, and in certain embodiments from about 350 nm to about 450 nm. If the photoinitiator is in the aqueous phase, suitable types of water-soluble photoinitiators include benzophenones, benzils, and thioxanthones. Examples of photoinitiators include 2,2'-Azobis[2-(2-imidazolin-2-yl)propane]dihydrochloride;

2,2'-Azobis[2-(2-imidazolin-2-yl)propane]disulfate dehydrate; 2,2'-Azobis(1-imino-1-pyrrolidino-2-ethylpropane)dihydrochloride; 2,2'-Azobis[2-methyl-N-(2-hydroxyethyl)propionamide]; 2,2'-Azobis(2-methylpropionamidine) dihydrochloride; 2,2'-dicarboxymethoxydibenzalacetone, 4,4'-dicarboxymethoxydibenzalacetone, 4,4'-dicarboxymethoxydibenzalcyclohexanone, 4-dimethylamino-4'-carboxymethoxydibenzalacetone; and 4,4'-disulphoxymethoxydibenzalacetone. Other suitable photoinitiators that can be used in the present invention are listed in U.S. Pat. No. 4,824,765 (Sperry et al.) issued Apr. 25, 1989.

In addition to the previously described components other components may be included in either the aqueous or oil phase of a HIPE. Examples include antioxidants, for example hindered phenolics, hindered amine light stabilizers; plasticizers, for example dioctyl phthalate, dinonyl sebacate; flame retardants, for example halogenated hydrocarbons, phosphates, borates, inorganic salts such as antimony trioxide or ammonium phosphate or magnesium hydroxide; dyes and pigments; fluorescers; filler particles, for example starch, titanium dioxide, carbon black, or calcium carbonate; fibers; chain transfer agents; odor absorbers, for example activated carbon particulates; dissolved polymers; dissolved oligomers; and the like.

HIPE foam is produced from the polymerization of the monomers comprising the continuous oil phase of a HIPE. In certain embodiments, HIPE foams may have one or more layers, and may be either homogeneous or heterogeneous polymeric open-celled foams. Homogeneity and heterogeneity relate to distinct layers within the same HIPE foam, which are similar in the case of homogeneous HIPE foams or which differ in the case of heterogeneous HIPE foams. A heterogeneous HIPE foam may contain at least two distinct layers that differ with regard to their chemical composition, physical properties, or both; for example layers may differ with regard to one or more of foam density, polymer composition, specific surface area, or pore size (also referred to as cell size). For example, for a HIPE foam if the difference relates to pore size, the average pore size in each layer may differ by at least about 20%, in certain embodiments by at least about 35%, and in still other embodiments by at least about 50%. In another example, if the differences in the layers of a HIPE foam relate to density, the densities of the layers may differ by at least about 20%, in certain embodiments by at least about 35%, and in still other embodiments by at least about 50%. For instance, if one layer of a HIPE foam has a density of 0.020 g/cc, another layer may have a density of at least about 0.024 g/cc or less than about 0.016 g/cc, in certain embodiments at least about 0.027 g/cc or less than about 0.013 g/cc, and in still other embodiments at least about 0.030 g/cc or less than about 0.010 g/cc. If the differences between the layers are related to the chemical composition of the HIPE or HIPE foam, the differences may reflect a relative amount difference in at least one monomer component, for example by at least about 20%, in certain embodiments by at least about 35%, and in still further embodiments by at least about 50%. For instance, if one layer of a HIPE or HIPE foam is composed of about 10% styrene in its formulation, another layer of the HIPE or HIPE foam should be composed of at least about 12%, and in certain embodiments of at least about 15%.

A HIPE foam having separate layers formed from differing HIPEs, as explained in more detail below, provides a HIPE foam with a range of desired performance characteristics. For example, a HIPE foam comprising a first and second foam layer, wherein the first foam layer has a relatively larger pore or cell size, than the second layer, when used in an absorbent article may more quickly absorb incoming fluids than the second layer. By way of example when used in an absorbent articled the first foam layer may be layered over the second foam layer having relatively smaller pore sizes, as compared to the first foam layer, which exert more capillary pressure and drain the acquired fluid from the first foam layer, restoring the first foam layer's ability to acquire more fluid. HIPE foam pore sizes may range in average diameter of from 1 to 200 µm and in certain embodiments may be less than 100 µm. HIPE foams produced from the present invention having two major parallel surfaces may be from 0.05 to 10 mm thick, and in certain embodiments 8 mm or less. The desired thickness of a HIPE will depend on the materials used to form the HIPE, the speed at which a HIPE is extruded on a belt, and the intended use of the resulting HIPE foam.

The HIPE foams produced from the present invention are relatively open-celled. This refers to the individual cells or pores of the HIPE foam being in substantially unobstructed communication with adjoining cells. The cells in such substantially open-celled HIPE foam structures have intercellular openings or windows that are large enough to permit ready fluid transfer from one cell to another within the HIPE foam structure. For purpose of the present invention, a HIPE foam is considered "open-celled" if at least about 80% of the cells in the HIPE foam that are at least 1 µm in average diameter size are in fluid communication with at least one adjoining cell.

In addition to being open-celled, in certain embodiments HIPE foams are sufficiently hydrophilic to permit the HIPE foam to absorb aqueous fluids, for example the internal surfaces of a HIPE foam may be rendered hydrophilic by residual hydrophilizing surfactants or salts left in the HIPE foam following polymerization, by selected post-polymerization HIPE foam treatment procedures (as described hereafter), or combinations of both.

In certain embodiments, for example when used in certain absorbent articles, a HIPE foam may be flexible and exhibit an appropriate glass transition temperature (Tg). The Tg represents the midpoint of the transition between the glassy and rubbery states of the polymer. In general, HIPE foams that have a higher Tg than the temperature of use can be very strong but will also be rigid and potentially prone to fracture. In certain embodiments, regions of the HIPE foams of the current invention which exhibit either a relatively high Tg or excessive brittleness will be discontinuous. Since these discontinuous regions will also generally exhibit high strength, they can be prepared at lower densities without compromising the overall strength of the HIPE foam.

HIPE foams intended for applications requiring flexibility should contain at least one continuous region having a Tg as low as possible, so long as the overall HIPE foam has acceptable strength at in-use temperatures. In certain embodiments, the Tg of this region will be less than about 30° C. for foams used at about ambient temperature conditions, in certain other embodiments less than about 20° C. For HIPE foams used in applications wherein the use temperature is higher or lower than ambient, the Tg of the continuous region may be no more that 10° C. greater than the use temperature, in certain embodiments the same as use temperature, and in further embodiments about 10° C. less than use temperature wherein flexibility is desired. Accordingly, monomers are selected as much as possible that provide corresponding polymers having lower Tg's.

The HIPE foams produced from the present invention may be used as absorbent core materials in absorbent articles, such as feminine hygiene articles, for example pads, pantiliners, and tampons; disposable diapers; incontinence articles, for example pads, adult diapers; homecare articles, for example wipes, pads, towels; and beauty care articles, for example pads, wipes, and skin care articles, such as used for pore cleaning.

To produce a HIPE using the above, an aqueous phase and an oil phase are combined in a ratio between about 8:1 and 140:1. In certain embodiments, the aqueous phase to oil phase ratio is between about 10:1 and about 75:1, and in certain other embodiments the aqueous phase to oil phase ratio is between about 13:1 and about 65:1. This is termed the "water-to-oil" or W:O ratio and can be used to determine the density of the resulting HIPE foam. As discussed, the oil phase may contain one or more of monomers, comonomers, photoinitiators, crosslinkers, and emulsifiers, as well as optional components. The water phase will contain water and in certain embodiments one or more components such as electrolyte, initiator, or optional components.

The HIPE can be formed from the combined aqueous and oil phases by subjecting these combined phases to shear agitation in a mixing chamber or mixing zone. The combined aqueous and oil phases are subjected to shear agitation to produce a stable HIPE having aqueous droplets of the desired size. An initiator may be present in the aqueous phase, or an initiator may be introduced during the HIPE making process, and in certain embodiments, after the HIPE has been formed but before the HIPE has been extruded on a belt or as in the present invention on a carrier sheet, a portion of which is in contact with a belt. The emulsion making process produces a HIPE where the aqueous phase droplets are dispersed to such an extent that the resulting HIPE foam will have the desired structural characteristics. Emulsification of the aqueous and oil phase combination in the mixing zone may involve the use of a mixing or agitation device such as an impeller, by passing the combined aqueous and oil phases through a series of static mixers at a rate necessary to impart the requisite shear, or combinations of both. Once formed, the HIPE can then be withdrawn or pumped from the mixing zone. One method for forming HIPEs using a continuous process is described in U.S. Pat. No. 5,149,720 (DesMarais et al), issued Sep. 22, 1992; U.S. Pat. No. 5,827,909 (DesMarais) issued Oct. 27, 1998; and U.S. Pat. No. 6,369,121 (Catalfamo et al.) issued Apr. 9, 2002.

In certain embodiments, as shown in FIG. 1, for a continuous process a HIPE can be withdrawn or pumped from the mixing zone and extruded on to a carrier sheet 10 disposed on a belt, such as an endless belt 20 travelling in a substantially horizontal direction. The HIPE may be extruded on to the carrier sheet 10 through one or more extruding devices such as a die 30 (as shown in FIG. 1), sprayer, or caster. In certain embodiments a HIPE is extruded in a substantially even thickness across the width of the carrier sheet 10 to form a sheet-like material. The average thickness of a HIPE, as measured from the surface of the HIPE that is in contact with the belt to the opposing HIPE surface, can be adjusted by the movement speed of the belt, the flow of HIPE extruded on the belt, or the configuration of one or more extruding devices used to extrude the HIPE on a belt.

When HIPE is extruded directly unto a belt the HIPE must be completely removed from the belt before more HIPE can be extruded unto the belt. Belts, and more specifically belt surfaces, are subject to wear and degradation during the HIPE foam making process. The process of producing HIPE foams from HIPEs can be extremely detrimental to a belt's integrity; compromising the surface of the belt to which a HIPE is extruded. For example, to polymerize the monomers in a HIPE, the polymerization reaction is generally accelerated using application of heat or energy, such as UV light. The heat whether applied directly through heating elements or indirectly using steam can be hazardous to the belt, as can the use of UV light. These procedures can degrade the surface coating of a belt, separate seams, cause bubbles to form underneath the belt surface, degrade the structural integrity of the belt, and combinations thereof. In contrast to a belt, a carrier sheet provides a smooth easy to peel surface, allowing a HIPE to be easily removed from a carrier sheet, as the carrier sheet is generally discarded after use. Further a carrier sheet will provide relatively higher quality HIPE foam as compared to a HIPE foam produced from a belt, as the HIPE foam will be substantially free from surface abnormalities, reducing the amount of defects in the HIPE foam produced.

Figure 2:
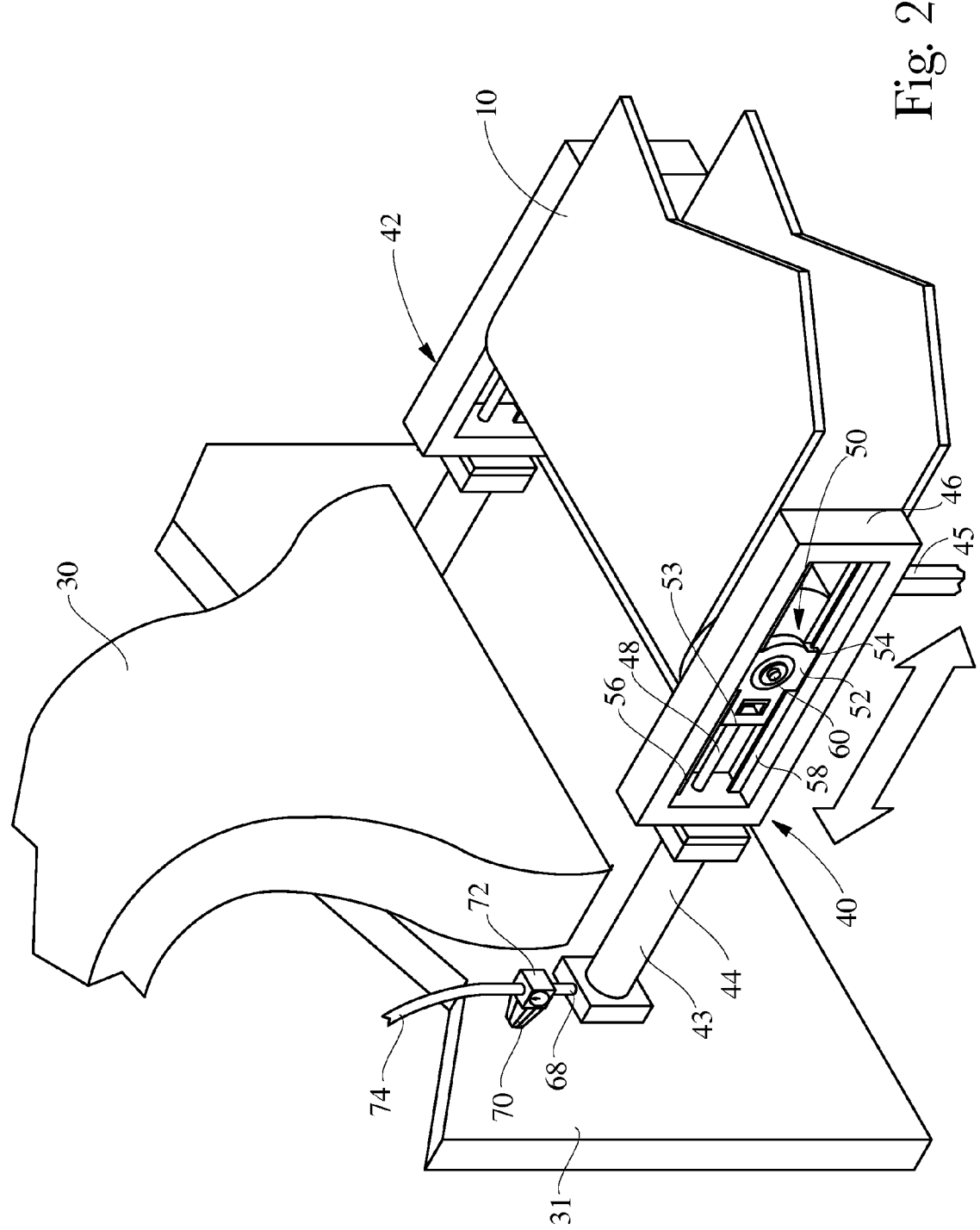
FIG. 2 is a perspective view of an embodiment of the present invention.

In one embodiment of the present invention, as shown in FIGS. 1 and 2 the extruding device is a die 30 mounted on a die stand 31. The die 30 extrudes a HIPE on to a carrier sheet 10 which is supported by a support plate 11 and the underlying belt 20. One or more retractable piston assemblies 40, which in this embodiment are attached at one end to the die stand 31, move the carrier sheet 10 either under the die 30 or away from the die 30. Retractable piston assemblies may be mounted at any suitable position along the HIPE foam making process. For example, in other embodiments, retractable piston assemblies may be mounted in an orientation opposite that shown in FIG. 1, by mounting a retractable piston assembly to the belt structure, such that the retractable piston assembly is facing the die stand rather than the belt. In addition, while FIG. 2 shows two retractable piston assemblies more or less retractable piston assemblies may be used. A retractable piston assembly allows control as to whether a HIPE is extruded on the carrier sheet. For example during start-up or at the end of the of the HIPE foam making process the HIPE that is produced can be in a condition that does not produce usable HIPE foam, however the HIPE will become part of the HIPE foam produced if it is extruded on the carrier sheet. Therefore, during these instances the carrier sheet is moved from under the extruding device, using a retractable piston assembly so that HIPE will not be extruded on the carrier sheet. Further, when the extruding device needs to be cleaned the waste generated during the cleaning process will not be extruded on the carrier sheet and the extruding device will be easier to access, as the carrier sheet can be moved out of the way using the retractable piston assembly, rather than having to move the extruding device.

Further, maintenance of the die to carrier sheet surface gap, which is useful for uniform HIPE deposition, is much easier to maintain with the equipment of this invention, as the retractable piston assembly and drive assemblies are much lighter than either the die and associated mixing equipment or the belt pulley assembly, and can be positioned against a mechanical stop, for example as a way of reproducibly returning the carrier sheet to the proper position with respect to the die. A further advantage lies in the measurement of the above mentioned gap. If the heating zone is, for example a steam oven heated with steam, measuring the gap with gauges is not easily or safely done when the steam oven is at full temperature, but that is when the measurement should be made, as the steam oven will change dimensions significantly between the room temperature state and the target polymerization temperature. Also, attempting to control the gap by adjusting the position of the belt pulley interferes with the need to keep the belt tracked.

In general the retractable piston assembly includes a fluid cylinder having a retractable piston interconnected with the rotatable shaft of a pulley supporting a carrier sheet. The fluid cylinder is integrated with a fluid regulator which regulates and controls the pressure of a fluid within the cylinder. By activating the retractable piston assembly, such as by adjusting the pressure exerted on a fluid within the fluid cylinder, the retractable piston can be extended or retracted allowing the shaft to move; thereby moving the carrier sheet towards or away from the extruding device. In the retracted position the retractable piston assembly facilitates uniform tension on the carrier sheet by applying a substantially constant force to a rotatable shaft supporting the carrier sheet. The retractable piston assembly also acts as a shock absorber in cushioning the carrier sheet when the carrier sheet is stretched or relaxed, such as due to loads placed on the carrier sheet, changes in the pulleys, or temperature fluctuations.

Figure 3:
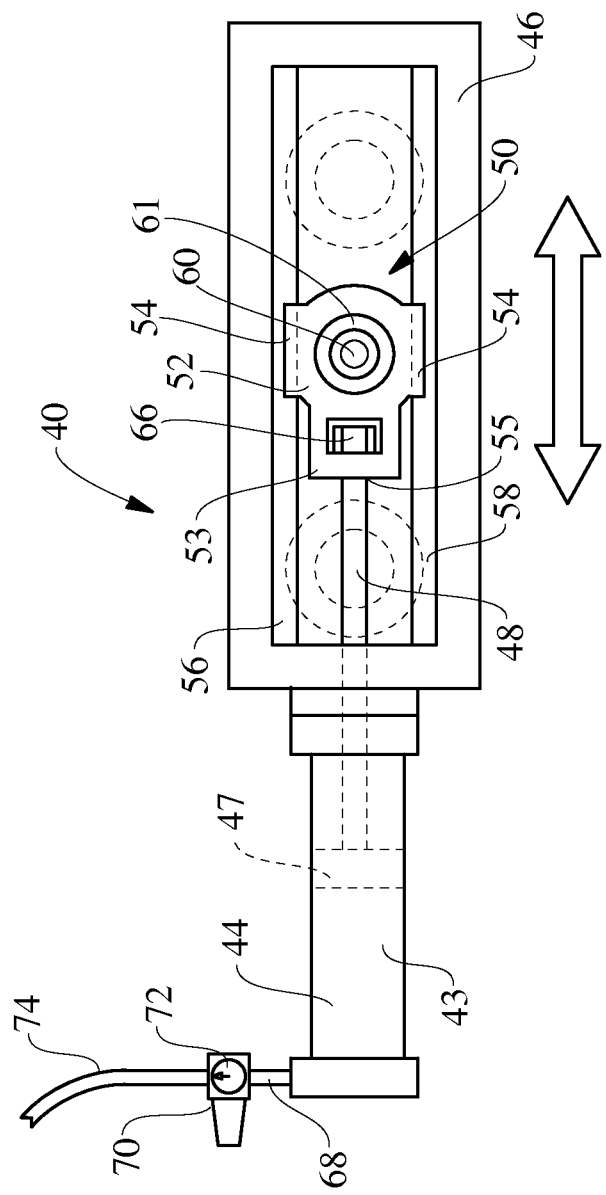
FIG. 3 is a side view of an embodiment of a retractable piston assembly of the present invention.

In one embodiment, as shown in FIG. 2, mounted on the die stand 31 on each side of the carrier sheet 10 are two retractable piston assemblies 40 and 42. Retractable piston assembly 40 is also illustrated in FIG. 3. Retractable piston assemblies 40 and 42 are adapted to receive each end of shaft 60. Retractable piston assemblies 40 and 42 also are configured to apply a substantially constant force to each end of shaft 60 for maintaining a substantially constant tension within the carrier sheet 10. As shown in FIGS. 2 and 3, retractable piston assembly 40 includes, in this embodiment, a pneumatic cylinder device 43 mounted to a frame 46. In addition to pneumatic cylinders, the retractable piston assembly of the present invention can also be used in conjunction with a hydraulic cylinder. The frame 46 may be mounted to any suitable surface, for example a floor mounted support stand 45. Cylinder device 43 includes a hollow cylinder 44 having therein an internal piston 47 that moves back and forth depending on the air pressure in cylinder 44. A piston rod 48 is connected to the piston 47 and extends into a channel defined by the frame 46. Piston rod 48 is interconnected with a bearing block assembly generally 50.

Bearing block assembly 50 is positioned within the space formed by the frame 46 and includes a bearing block 52. Block 52 defines appropriately sized slots 54 at its top and bottom, as shown FIG. 2 and FIG. 3. Slots 54 mate with guide elements 56 and 58 of frame 46 for movement there along. A bearing 61, mounted to bearing block 52, defines a shaft receiving opening into which shaft 60 is supported for rotation. Typically, bearing block 52 will have opposing ring elements with a plurality of bearing elements there between. One of the ring elements will rotate with shaft 60, whereas the other ring element will remain stationary relative to the bearing block 52. In some embodiments, the stationary ring element may be integrated with the bearing block 52. It should also be appreciated that any suitable type of bearing may be used for this purpose. The bearing block 52 includes an extending portion 53, which defines an opening 55 (as indicated in FIG. 3) for receiving the piston rod 48. A nut 66 is located within extending portion 53 and is connected to piston rod 48 for interconnecting the piston to the bearing block 52.

Figure 4:
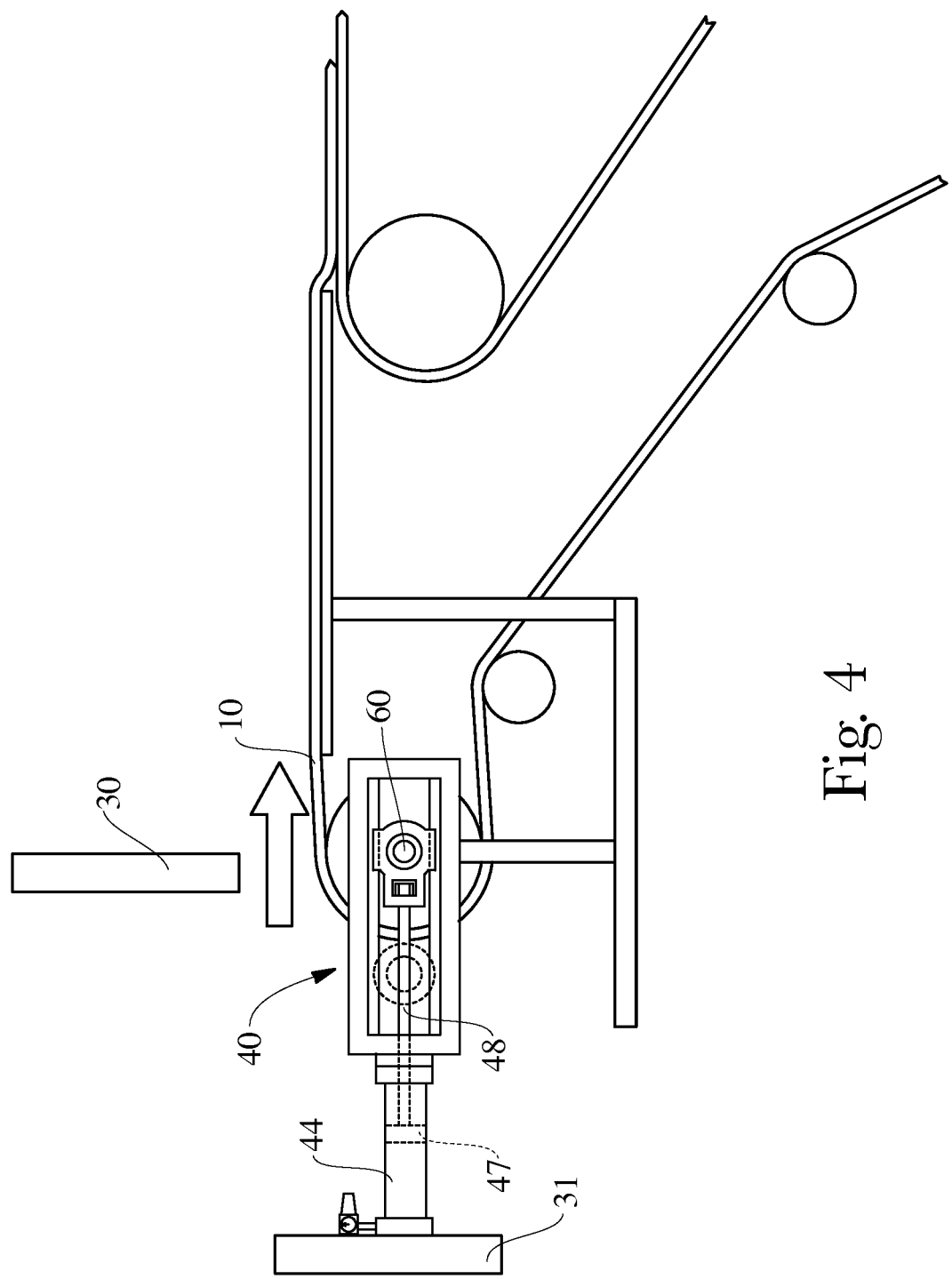
FIG. 4 is a side view illustrating an embodiment of a retractable piston assembly and carrier sheet configuration of the present invention.
Figure 5:
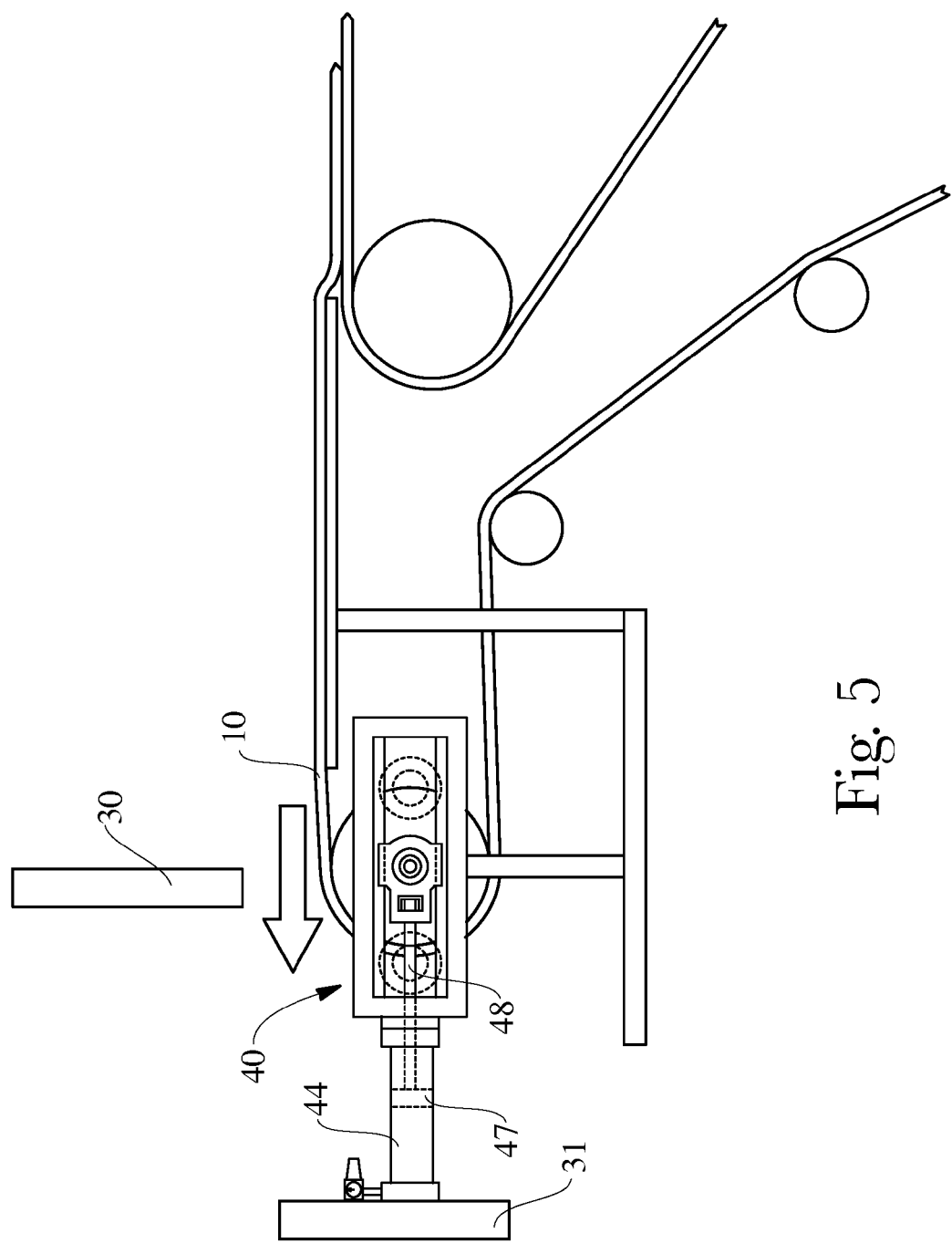
FIG. 5 is a side view illustrating an embodiment of a retractable piston assembly and carrier sheet configuration of the present invention.
Figure 6:
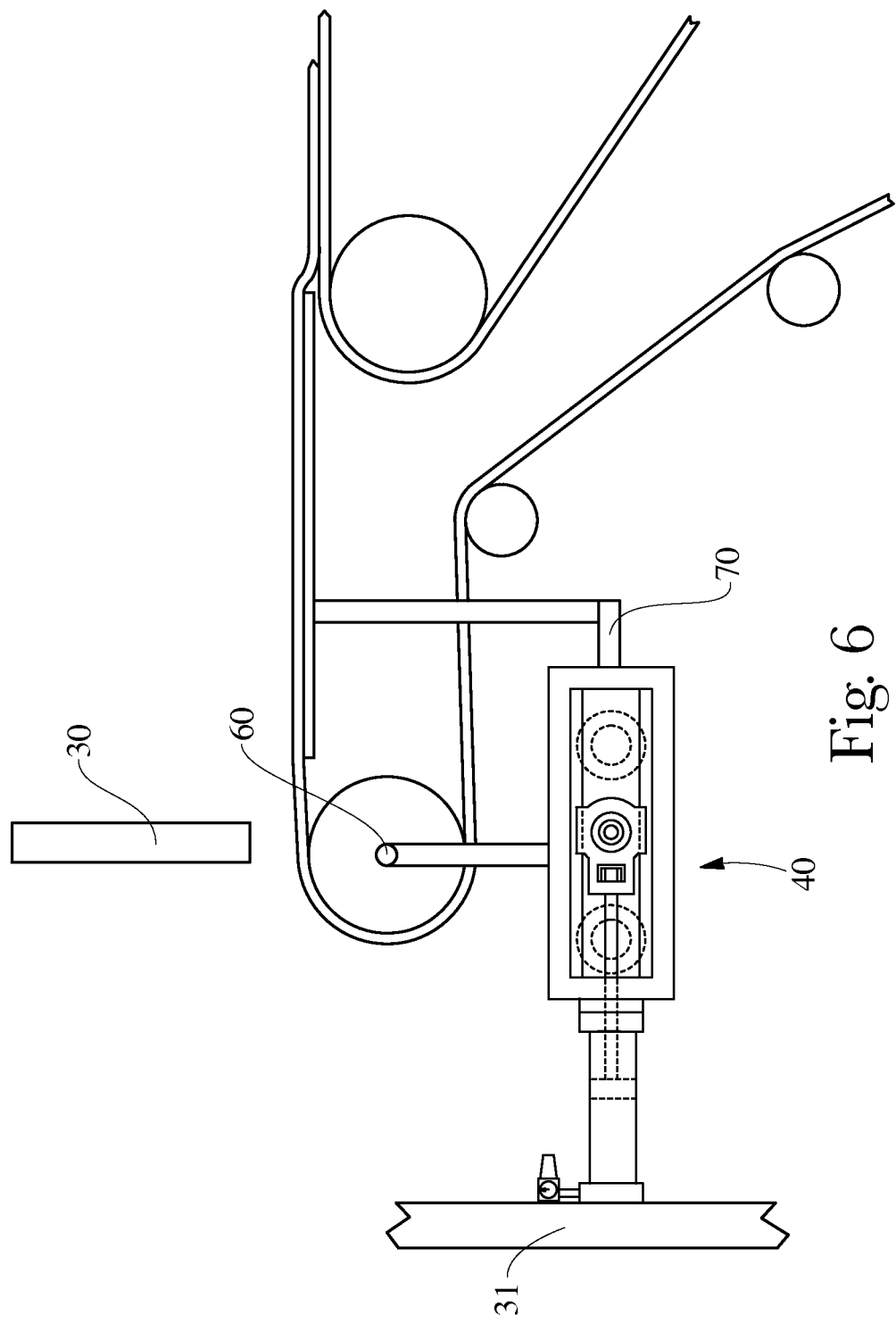
FIG. 6 is a side view illustrating an embodiment of a retractable piston assembly and carrier sheet configuration of the present invention.

Pneumatic cylinder device 43 includes a fluid inlet 68 which is in communication with a fluid regulator 70. Fluid regulator 70, which can include a pressure gauge 72, is connected to an inlet hose 74. During operation, a pressurized fluid such as air is fed into cylinder 44 through inlet hose 74. Fluid regulator 70 is used to maintain the desired pressure level within cylinder 44 as may be indicated on pressure gauge 72. As shown in FIG. 4, when pressurized fluid is fed in one direction into cylinder 44, the piston 47, and thus the piston rod 48, is pushed outward, thereby extending the rotatable shaft 60 and moving the carrier sheet 10 away from the die 30. Conversely, as pressurized fluid is moved in the opposite direction or fluid is bled out of the cylinder 44, the piston 47 and thus the piston rod 48, returns inward, thereby retracting the rotatable shaft 60 and moving the carrier sheet 10 towards the die 30. While FIG. 4 and FIG. 5 show the retractable pistons in direct contact with the rotatable shaft of a pulley other embodiments are possible. For example, as shown in FIG. 6 the retractable piston assembly 40 could be connected to an intermediate structure, such as a stand 70, that is then connected to a rotatable shaft 60.

Figure 7:
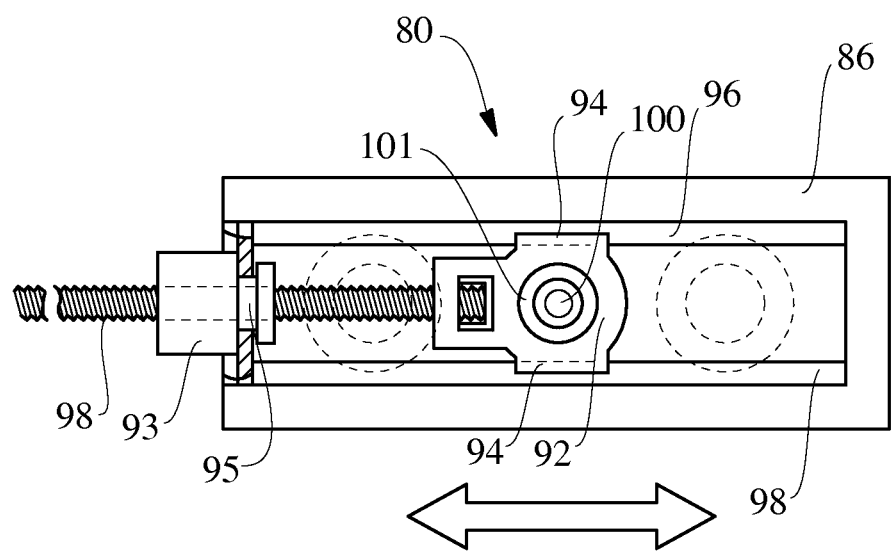
FIG. 7 is a side view of an embodiment of a retractable piston assembly of the present invention.

In certain embodiments, the retractable piston assembly of the present invention can be used with a screw-type mechanism. An example of a retractable piston assembly having a screw-type mechanism is shown in FIG. 7. As in the pneumatic and hydraulic embodiments, the retractable piston assembly 80 having a screw-type mechanism can be mounted to a die stand, and includes a frame 86 and mounted in the frame 86 for sliding motion between upper and lower guide elements 96 and 98 is a bearing block assembly 90 positioned within the space formed by the frame 86 and includes a bearing block 92. The bearing block 92 has upper and lower slots 94 that engage with the guide elements 96, 98. A bearing 101, mounted to the bearing block 92, defines a shaft receiving opening into which shaft 100 is supported for rotation. Typically, bearing block 92 will have opposing ring elements with a plurality of bearing elements there between. One of the ring elements will rotate with shaft 100, whereas the other ring element will remain stationary relative to bearing block 92. In some embodiments, the stationary ring element may be integrated with the bearing block 92. It should also be appreciated that any suitable type of bearing may be used for this purpose.

A motion transmission screw 98 positioned midway between the guide elements 96, 98 and parallel therewith is connected to the bearing block 92 at one end and extends therefrom through and in threaded engagement with a nut 93. The nut 93 has a short, reduced diameter portion 95 extending through the aperture formed in the frame 86, whereby it is held in place in the aperture and retained against axial movement. Rotation of nut 93 therefore imparts linear motion to the bearing block 92 either retracting or extending the shaft 100, thereby moving the carrier sheet towards or away from the extruding die.

The carrier sheet may have a thickness that in certain embodiments in the range of from about 0.005 mm to about 0.1 mm. The carrier sheet may comprise one or more materials suitable for the polymerization conditions (various properties such as heat resistance, chemical resistance, weatherability, surface energy, abrasion resistance, recycling property, tensile strength and other mechanical strengths) and may comprise at least one material from the group including films, non-woven materials, woven materials, and combinations thereof. Examples of films include, fluorine resins such as polytetrafluoroethylene, tetrafluoroethylene-perfluoroalkylvinyl ether copolymers, tetrafluoroethylene-hexafluoropropylene copolymers, and tetrafluoroethylene-ethylene copolymers; silicone resins such as dimethyl polysiloxane and dimethylsiloxane-diphenyl siloxane copolymers; heat-resistant resins such as polyimides, polyphenylene sulfides, polysulfones, polyether sulfones, polyether imides, polyether ether ketones, and para type aramid resins; thermoplastic polyester resins such as polyethylene terephthalates, polybutylene terephthalates, polyethylene naphthalates, polybutylene naphthalates, and polycyclohexane terephthalates, thermoplastic polyester type elastomer resins such as block copolymers (polyether type) formed of PBT and polytetramethylene oxide glycol and block copolymers (polyester type) formed of PBT and polycaprolactone may be used. These materials may be used either singly or in mixed form of two or more materials. Further, a carrier sheet may be a laminate comprising two or more different materials or two or more materials of the same composition, but which differ in one or more physical characteristics, such as quality or thickness. Still further, the carrier sheet surface can be treated to modify its properties, such as contact angle, surface energy, chemical resistance, or other properties useful in the present invention. In certain embodiments a carrier sheet has substantially the same width as the belt it is disposed on. In other embodiments a carrier sheet may have a width greater or less than the belt it is disposed on.

Examples of belts that may be used in the present invention may be made of one or more metals, a resin, impregnated woven or non-woven plies, or combinations thereof. A belt can be any thickness or shape suitable for producing a HIPE foam.

A belt and a carrier sheet may be advanced at a substantially similar speed in the same direction at least during the polymerization of HIPE, and in certain embodiments between the time a HIPE is supplied and the time the HIPE polymerization is completed. In certain embodiments a carrier sheet may be applied to a belt using a releasable adhesive, such as a tackifier. In certain embodiments the speed at which a carrier sheet moves is determined by the speed of the belt upon which the carrier sheet rests, as the carrier sheet is frictionally but releasably attached to the belt surface. In certain embodiments the presence of water vapor in the HIPE foam making process, for example when steam heat is used to accelerate polymerization, condenses to produce moisture that acts to form a releasable bond between the carrier sheet and the belt surface, aiding the ability of the belt to drive the movement of the carrier sheet. The use of the belt to move the carrier sheet helps to ensure that the carrier sheet and belt are travelling at substantially the same speed, which decreases the chance of producing deformations in the carrier sheet such as folds or ripples.

In certain other embodiments, with reference back to FIG. 1, the speed of a carrier sheet 10 may be controlled by the speeds of rotation of an unwind roller 12 and wind roller 14, so that the carrier sheet 10 may travel at substantially the same speed in the same direction as the belt 20, and meanwhile allowed to exert tension to produce a relatively flat surface to receive the HIPE from an extruding device.

In certain embodiments, a carrier sheet moves the HIPE into a heating zone where the monomers present in the HIPE are polymerized. Without being bound by theory, it is believed that HIPE foam formation comprises two overlapping processes. These are the polymerization of the monomers and the formation of crosslinks between active sites on adjacent polymer backbones. As used herein the term "polymerize" as in to polymerize monomers to form a HIPE foam encompass both polymerization of monomers and formation of crosslinks between active sites on adjacent polymer backbones. Crosslinking provides HIPE foams with strength and integrity that is helpful to their further handling and use. The current invention involves increasing the overall level of polymerization and cross-linking, thereby reducing the amount of unpolymerized monomer in the HIPE foam. Polymerization can be initiated prior to reaching the heating zone by, for example, preparing the HIPE at a temperature sufficient to begin polymerization. However, the HIPE is polymerized beyond the point of shapability or moldability in the heating zone. Heat for the heating zone can be, for example, derived from an oven located above and below the HIPE or surrounding the HIPE. Heat can be from forced air ovens, IR heat lamps, microwave, steam or other suitable source. As an example of using steam the heat zone may be a steam oven wherein the HIPE is exposed to steam, thereby achieving highly efficient thermal transfer as water condenses onto the HIPE.

In certain embodiments, the temperature may be elevated in a step-wise manner so as to increase the rate of polymerization, initiate drying, or both as the HIPE becomes more completely polymerized. In addition, the curing of the HIPE may be accomplished by passing the web through a hot liquid bath composed of any hot liquid of sufficient temperature to initiate the curing of the monomers. Polymerization temperatures will vary depending on the type of emulsion being cured, the initiator being used, heat source used, and whether or not the heating zone is sealed, but will typically be above 25° C., often above 50° C. In certain embodiments, polymerization temperatures within the heating zone may reach between about 50° C. and 150° C. The HIPE is maintained in the heating zone for a time sufficient to polymerize at least 75%, preferably at least 90% of the monomers in the oil phase of the HIPE. Sufficient polymerization of the HIPE may be controlled by a combination of the initiator used, the temperature of the heat zone, the efficiency of the heat transfer in the heat zone, the rate at which the HIPE goes through the heat zone and the length of the heat zone.

The monomers present in the HIPE are substantially polymerized in the heating zone. In certain embodiments, in place of or in addition to a heating zone, Ultraviolet (UV) light may be used to polymerize the monomers of a HIPE. For example, a HIPE may be pre-polymerized using UV light before entering a curing oven, or a HIPE foam could be exposed to UV light upon exiting a curing oven to reduce the level of unreacted monomers, or the UV light could be used in place of a curing oven to polymerize the monomers of a HIPE. There may be one or more sources of UV light used to polymerize the HIPE monomers. The sources may be the same or differ. For example, the sources may differ in the wavelength of the UV light they produce or in the amount of time a HIPE is exposed to the UV light source. The UV light wavelength in the range from about 200 to about 400 nm, and in certain embodiments from about 200 nm to 350 nm, overlaps to at least some degree with the UV light absorption band of the photoinitiator and is of sufficient intensity and exposure duration to polymerize monomers in a HIPE.

Following polymerization, the resulting HIPE foam is saturated with aqueous phase that needs to be removed to obtain substantially dry HIPE foam. In certain embodiments, HIPE foams can be squeezed free of most of the aqueous phase by using compression, for example by running the HIPE foam through one or more pairs of nip rollers. The nip rollers can be positioned such that they squeeze the aqueous phase out of the HIPE foam. The nip rollers can be porous and have a vacuum applied from the inside such that they assist in drawing aqueous phase out of the HIPE foam. In certain embodiments, nip rollers can be positioned in pairs, such that a first nip roller is located above a liquid permeable belt, such as a belt having pores or composed of a mesh-like material and a second opposing nip roller acing the first nip roller and located below the liquid permeable belt. One of the pair, for example the first nip roller can be pressurized while the other, for example the second nip roller, can be evacuated, so as to both blow and draw the aqueous phase out the of the HIPE foam. The nip rollers may also be heated to assist in removing the aqueous phase. In certain embodiments, nip rollers are only applied to non-rigid HIPE foams, that is HIPE foams whose walls would not be destroyed by compressing the HIPE foam. In yet a further embodiment, the surface of the nip rollers may contain irregularities in the form of protuberances, depressions, or both such that a HIPE foam can be embossed as it is moving through the nip rollers. When the HIPE has the desired dryness it may be cut or sliced into a form suitable for the intended application.

In certain embodiments, in place of or in combination with nip rollers, the aqueous phase may be removed by sending the HIPE foam through a drying zone where it is heated, exposed to a vacuum, or a combination of heat and vacuum exposure. Heat can be applied, for example, by running the foam though a forced air oven, IR oven, microwave oven or radiowave oven. The extent to which a HIPE foam is dried depends on the application. In certain embodiments, greater than 50% of the aqueous phase is removed. In certain other embodiments greater than 90%, and in still other embodiments greater than 95% of the aqueous phase is removed during the drying process.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A High Internal Phase Emulsion foam producing system comprising:
   a High Internal Phase Emulsion extruding device that extrudes a High Internal Phase Emulsion;
   a belt;
   a carrier sheet, wherein at least a portion of the carrier sheet is in contact with the belt and is configured to provide a releasable surface for the produced High Internal Phase Emulsion foam to be substantially free from surface irregularities and to reduce formation of defects in the produced High Internal Phase Emulsion foam; and
   a retractable piston assembly, wherein the retractable piston assembly is in operable association with the carrier sheet; wherein the retractable piston assembly is capable of positioning the carrier sheet directly under the extrusion device or away from and not under the extrusion device;
   wherein the extruding device is configured to extrude the High Internal Phase Emulsion onto the carrier sheet and wherein the carrier sheet is configured to rest upon the belt and to move in a horizontal direction along with the belt to transport the High Internal Phase Emulsion from the extruding device to a following stage of High Internal Phase Emulsion foam production.

2. The system of claim 1, wherein the retractable piston assembly comprises:
   a bearing adapted to rotatably receive a shaft in a first direction, the bearing being movable in a second direction substantially perpendicular to the first direction;
   a fluid cylinder in operative association with a movable piston, said piston being interconnected with said bearing, said fluid cylinder including a fluid inlet for receiving a pressurized fluid, wherein, when a pressurized fluid is introduced into said cylinder, said piston applies a force to said bearing in said second direction; and
   a fluid regulator in communication with said fluid inlet for controlling and regulating the pressure of a fluid within said cylinder, said fluid regulator controlling the amount of fluid entering and exiting said fluid cylinder from a pressurized fluid source, wherein said fluid regulator is configured to adjust the fluid pressure within the cylinder to either retract or extend the piston.

3. The system of claim 2, wherein the fluid cylinder is a pneumatic cylinder.

4. The system of claim 1, wherein the retractable piston assembly comprises:
   a block having a bearing adapted to rotatably receive a shaft in a first direction, the bearing being movable in a second direction substantially perpendicular to the first direction;
   a motion transmission screw connected to the block at one end and extending therefrom through and in threaded engagement with a nut.

5. The system of claim 1, wherein the carrier sheet comprises at least one of fluorine resins, silicone resins, polyimides, polyphenylene sulfides, polysulfones, polyether sulfones, polyether imides, polyether ether ketones, para type aramid resins; thermoplastic polyester resins, or thermoplastic polyester type elastomer resins.

6. The system of claim 5, wherein the endless belt comprises at least one of polytetrafluoroethylene, tetrafluoroethylene-perfluoroalkylvinyl ether copolymers, tetrafluoroethylene-hexafluoropropylene copolymers, tetrafluoroethylene-ethylene copolymers, dimethyl polysiloxanes, dimethylsiloxane-diphenyl siloxane copolymers, polyethylene terephthalates, polybutylene terephthalates, polyethylene naphthalates, polybutylene naphthalates, polycyclohexane terephthalates, polyether block copolymers, or polyester block copolymers.

7. The system of claim 1, wherein the belt is an endless belt.

8. The system of claim 7, wherein the endless belt comprises at least one of films, non-woven materials, or woven materials.

9. The system of claim 1, wherein the High Internal Phase Emulsion extruder is at least one of a die, sprayer, or caster.

10. A High Internal Phase Emulsion foam producing system comprising:
    an extruding device that extrudes a High Internal Phase Emulsion;
    a belt;
    a carrier sheet, wherein at least a portion of the carrier sheet is in contact with the belt and is configured to provide a releasable surface for the produced High Internal Phase Emulsion foam to be substantially free from surface irregularities and to reduce formation of defects in the produced High Internal Phase Emulsion foam; and
    a rotatable shaft adapted to support and rotate with the carrier sheet, the rotatable shaft having a first end and a second end;
    a retractable piston assembly, mounted to the first end and second end of the rotatable shaft; wherein the retractable piston assembly is capable of positioning the carrier sheet directly under the extrusion device or away from and not under the extrusion device; wherein the carrier sheet is configured to rest upon the belt and to move in a horizontal direction along with the belt to transport the High Internal Phase Emulsion from the extruding device to a following stage of High Internal Phase Emulsion foam production.

11. The system of claim 10, wherein the retractable piston assembly comprises:
a bearing adapted to rotatably receive the shaft in a first direction, the bearing being movable in a second direction substantially perpendicular to the first direction;
a fluid cylinder in operative association with a movable piston, said piston being interconnected with said bearing, said fluid cylinder including a fluid inlet for receiving a pressurized fluid, wherein, when a pressurized fluid is introduced into said cylinder, said piston applies a force to said bearing in said second direction; and
a fluid regulator in communication with said fluid inlet for controlling and regulating the pressure of a fluid within said cylinder, said fluid regulator controlling the amount of fluid entering and exiting said fluid cylinder from a pressurized fluid source, wherein said fluid regulator is configured to adjust the fluid pressure within the cylinder to either retract or extend the piston.

12. The system of claim 11, wherein the fluid cylinder is a pneumatic cylinder.

13. The system of claim 10, wherein the retractable piston assembly comprises:
a block having a bearing adapted to rotatably receive the shaft in a first direction, the bearing being movable in a second direction substantially perpendicular to the first direction;
a motion transmission screw connected to the block at one end and extending therefrom through and in threaded engagement with a nut.

14. The system of claim 10, wherein the carrier sheet comprises at least one of fluorine resins, silicone resins, polyimides, polyphenylene sulfides, polysulfones, polyether sulfones, polyether imides, polyether ether ketones, para type aramid resins; thermoplastic polyester resins, or thermoplastic polyester type elastomer resins.

15. The system of claim 14, wherein the endless belt comprises at least one of polytetrafluoroethylene, tetrafluoroethylene-perfluoroalkylvinyl ether copolymers, tetrafluoroethylene-hexafluoropropylene copolymers, tetrafluoroethylene-ethylene copolymers, dimethyl polysiloxanes, dimethylsiloxane-diphenyl siloxane copolymers, polyethylene terephthalates, polybutylene terephthalates, polyethylene naphthalates, polybutylene naphthalates, polycyclohexane terephthalates, polyether block copolymers, or polyester block copolymers.

16. The system of claim 10, wherein the belt is an endless belt.

17. The system of claim 16, wherein the endless belt comprises at least one of films, non-woven materials, or woven materials.

18. The system of claim 10, wherein the High Internal Phase Emulsion extruder is at least one of a die, sprayer, or caster.

19. The High Internal Phase Emulsion foam producing system of claim 1, wherein the carrier sheet has a thickness between 0.005 mm to 0.1 mm.

20. The apparatus of claim 1, wherein the carrier sheet is discardable.

* * * * *